US012684574B2

(12) United States Patent
Fu et al.

(10) Patent No.: US 12,684,574 B2
(45) Date of Patent: Jul. 14, 2026

(54) METHOD AND DEVICE FOR TRANSMITTING AND RECEIVING HYBRID AUTOMATIC RETRANSMISSION REQUEST ACKNOWLEDGEMENT INFORMATION

(71) Applicant: Samsung Electronics Co., Ltd., Suwon-si (KR)

(72) Inventors: Jingxing Fu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 18/304,960

(22) Filed: Apr. 21, 2023

(65) Prior Publication Data

US 2023/0345483 A1 Oct. 26, 2023

(30) Foreign Application Priority Data

Apr. 21, 2022 (CN) .......................... 202210425670.2

(51) Int. Cl.
*H04W 72/1273* (2023.01)
*H04L 1/1812* (2023.01)
*H04W 72/21* (2023.01)

(52) U.S. Cl.
CPC ....... *H04W 72/1273* (2013.01); *H04L 1/1812* (2013.01); *H04W 72/21* (2023.01)

(58) Field of Classification Search
CPC . H04W 72/1273; H04W 72/21; H04W 72/30; H04W 72/232; H04L 1/1812;
(Continued)

(56) References Cited

U.S. PATENT DOCUMENTS

2021/0029694 A1 1/2021 Nayeb Nazar et al.
2022/0007399 A1 1/2022 Rastegardoost et al.
(Continued)

FOREIGN PATENT DOCUMENTS

CN 113573256 A 10/2021
WO 2022/061249 A1 3/2022

OTHER PUBLICATIONS

Extended Search Report dated Dec. 4, 2024, issued in European Application No. 23792248.9-1206.
(Continued)

*Primary Examiner* — Sharmin Chowdhury
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method and device for transmitting hybrid automatic repeat request acknowledgement (HARQ-ACK) information are provided. The method includes receiving, from a base station (BS), downlink control information (DCI) scheduling one or more multicast physical downlink shared channels (PDSCHs), wherein the DCI includes a downlink assignment indication (DAI) associated with the one or more multicast PDSCHs, receiving, from the BS, the one or more multicast PDSCHs based on the DCI, in case that a number of hybrid automatic repeat request-acknowledgement (HARQ-ACK) bits for the one or more multicast PDSCHs is one, transmitting, to the BS, a first physical uplink control channel (PUCCH) resource including a NACK (negative acknowledgement) value, and in case that the number of HARQ-ACK bits for the one or more multicast PDSCHs is more than one, transmitting, to the BS, a second PUCCH resource among configured PUCCH resources according to the number of the HARQ-ACK bits.

12 Claims, 12 Drawing Sheets

(58) Field of Classification Search
CPC ................. H04L 1/1896; H04L 5/0055; H04L 2001/0093; H04L 1/1861; H04L 5/001; H04L 1/1854; H04L 1/1671; H04L 1/1858
See application file for complete search history.

(56) References Cited

U.S. PATENT DOCUMENTS

| | | | |
|---|---|---|---|
| 2023/0047407 A1 | 2/2023 | Li et al. | |
| 2023/0224086 A1* | 7/2023 | Lee ...................... | H04L 1/1812 370/329 |
| 2024/0381360 A1* | 11/2024 | Yoshioka .............. | H04W 72/21 |

OTHER PUBLICATIONS

NTT DOCOMO, Inc.; Discussion on HARQ-ACK feedback for multicast for RRC_Connected UEs, 3GPP TSG-RAN WG1 #107-e, R1-2112129, Nov. 5, 2021.

OPPO; Remaining issues on UL feedback for MBS of RRC-CONNECTED UEs, 3GPP TSG RAN WGI #108-e, RI-2201258, Feb. 14, 2022.

Ericsson; Discussion on reliability mechanisms for NR MBS, 3GPP TSG-RAN WGI Meeting #107bis-e, R1-2200666, Jan. 11, 2022.

Samsung, Corrections on the introduction of multicast-broadcast services in NR, R1-2202951, 3GPP TSG RAN WG1 Meeting #108-e, e-Meeting, Mar. 13, 2022.

International Search Report and Written Opinion dated Aug. 8, 2023, issued in International Patent Application No. PCT/KR2023/005482.

LG Electronics Inc., Mechanisms to improve Reliability of Broadcast/Multicast service, R1-2202350, 3GPP TSG RAN WG1 Meeting #108-e, Online, Feb. 14, 2022.

Korean Office Action dated May 18, 2026, issued in Korean Patent Application No. 10-2024-7034311.

* cited by examiner

400

410

RECEIVE CONTROL INFORMATION FROM BASE STATION

420

RECEIVE A PLURALITY OF DOWNLINK DATA FROM BASE STATION BASED ON CONTROL INFORMATION

430

DETERMINE RESOURCE FOR TRANSMITTING HARQ-ACK INFORMATION FOR THE PLURALITY OF DOWNLINK DATA BASED ON CONTROL INFORMATION

440

TRANSMIT HARQ-ACK INFORMATION TO BASE STATION ON DETERMINED RESOURCE

700

710

DETERMINE UPLINK CHANNEL RESOURCE SET

720

DETERMINE UPLINK CHANNEL RESOURCE FROM UPLINK
CHANNEL RESOURCE SET ACCORDING TO HARQ-ACK
INFORMATION

730

TRANSMIT HARQ-ACK INFORMATION ON
DETERMINED UPLINK CHANNEL RESOURCE

METHOD AND DEVICE FOR TRANSMITTING AND RECEIVING HYBRID AUTOMATIC RETRANSMISSION REQUEST ACKNOWLEDGEMENT INFORMATION

CROSS-REFERENCE TO RELATED APPLICATION(S)

This application is based on and claims priority under 35 U.S.C. § 119(a) of a Chinese patent application number 202210425670.2, filed on Apr. 21, 2022, in the Chinese Patent Office, the disclosure of which is incorporated by reference herein in its entirety.

BACKGROUND

1. Field

The disclosure relates to the technical field of wireless communication. More particularly, the disclosure relates to a method and device for transmission of hybrid automatic repeat request acknowledgement (HARQ-ACK) feedback information.

2. Description of Related Art

5th generation (5G) mobile communication technologies define broad frequency bands such that high transmission rates and new services are possible, and may be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmission of HARQ-ACK feedback information, such as a method for transmission of HARQ-ACK(s) for PDSCH(s).

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes determining an uplink channel resource set, determining an uplink channel resource from the uplink channel resource set according to hybrid automatic repeat request acknowledgement (HARQ-ACK) information, and transmitting the HARQ-ACK information on the determined uplink channel resource.

In an implementation, wherein the determining an uplink channel resource from the uplink channel resource set according to hybrid automatic repeat request acknowledgement (HARQ-ACK) information, includes determining the HARQ-ACK information according to a first number of received downlink channels, determining an uplink channel resource subset from the uplink channel resource set according to the first number, and determining the uplink channel resource from the uplink channel resource subset according to the HARQ-ACK information.

In an implementation, wherein the first number of downlink channels is determined based on received downlink allocation indication (DAI) and/or semi-persistent scheduling (SPS) related information.

In an implementation, wherein the determining an uplink channel resource from the uplink channel resource set according to hybrid automatic repeat request acknowledgement (HARQ-ACK) information, includes determining a second number of downlink channels based on first indication information configured through higher-layer signaling, if a third number of received downlink channels is less than the second number, appending a fourth number of NACKs to HARQ-ACK information for the received downlink channels to obtain the HARQ-ACK information, wherein the fourth number is equal to a difference between the second number and the third number, and determining the uplink channel resource from the uplink channel resource set according to the HARQ-ACK information.

In an implementation, wherein the first indication information indicates a number of downlink channels for which feedback of HARQ-ACK information is required or a number of uplink channel resources in an uplink channel resource set for feedback of HARQ-ACK information.

In an implementation, wherein the determining the uplink channel resource set, includes receiving an uplink channel resource set configured through higher-layer signaling.

In an implementation, wherein the determining an uplink channel resource from the uplink channel resource set, includes determining the uplink channel resource from the uplink channel resource set based on received second indication information configured through higher-layer signaling.

In accordance with another aspect of the disclosure, a method performed by a base station in a wireless communication system is provided. The method includes configuring an uplink channel resource set to a user equipment (UE), transmitting a downlink channel to the UE, and receiving hybrid automatic repeat request acknowledgement (HARQ-ACK) information from the UE, wherein the HARQ-ACK information is transmitted on an uplink channel resource determined from the uplink channel resource set according to the HARQ-ACK information.

In an implementation, wherein the HARQ-ACK information is determined according to a first number of received downlink channels, the uplink channel resource is determined from an uplink channel resource subset determined from the uplink channel resource set according to the first number, according to the HARQ-ACK information.

In an implementation, wherein the first number is determined based on received downlink allocation indication (DAI) and/or semi-persistent scheduling (SPS) related information.

In an implementation, the method further includes configuring first indication information to the UE through higher-layer signaling, wherein the HARQ-ACK information is determined by the following, if a third number of downlink channels received by the UE is smaller than a second number of downlink channels determined based on the first indication information, a fourth number of NACKs are appended to HARQ-ACK information for received downlink channels to obtain the HARQ-ACK information, wherein the fourth number is equal to a difference between the second number and the third number.

In an implementation, wherein the first indication information indicates a number of downlink channels for which feedback of HARQ-ACK information is required or a number of uplink channel resources in an uplink channel resource set for feedback of HARQ-ACK information.

In an implementation, wherein the uplink channel resource set is configured through higher-layer signaling.

In an implementation, the method further includes configuring second indication information to the UE through higher-layer signaling, wherein the second indication information is used by the UE to determine the uplink channel resource from the uplink channel resource set.

In accordance with another aspect of the disclosure, a user equipment (UE) in a communication system is provided. The UE includes a transceiver configured to transmit and/or receive signals, and a processor coupled to the transceiver and configured to perform any of the methods according to the embodiments of the disclosure.

In accordance with another aspect of the disclosure, a base station in a communication system is provided. The base station includes a transceiver configured to transmit and/or receive signals, and a processor coupled to the transceiver and configured to perform any of the methods according to the embodiments of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
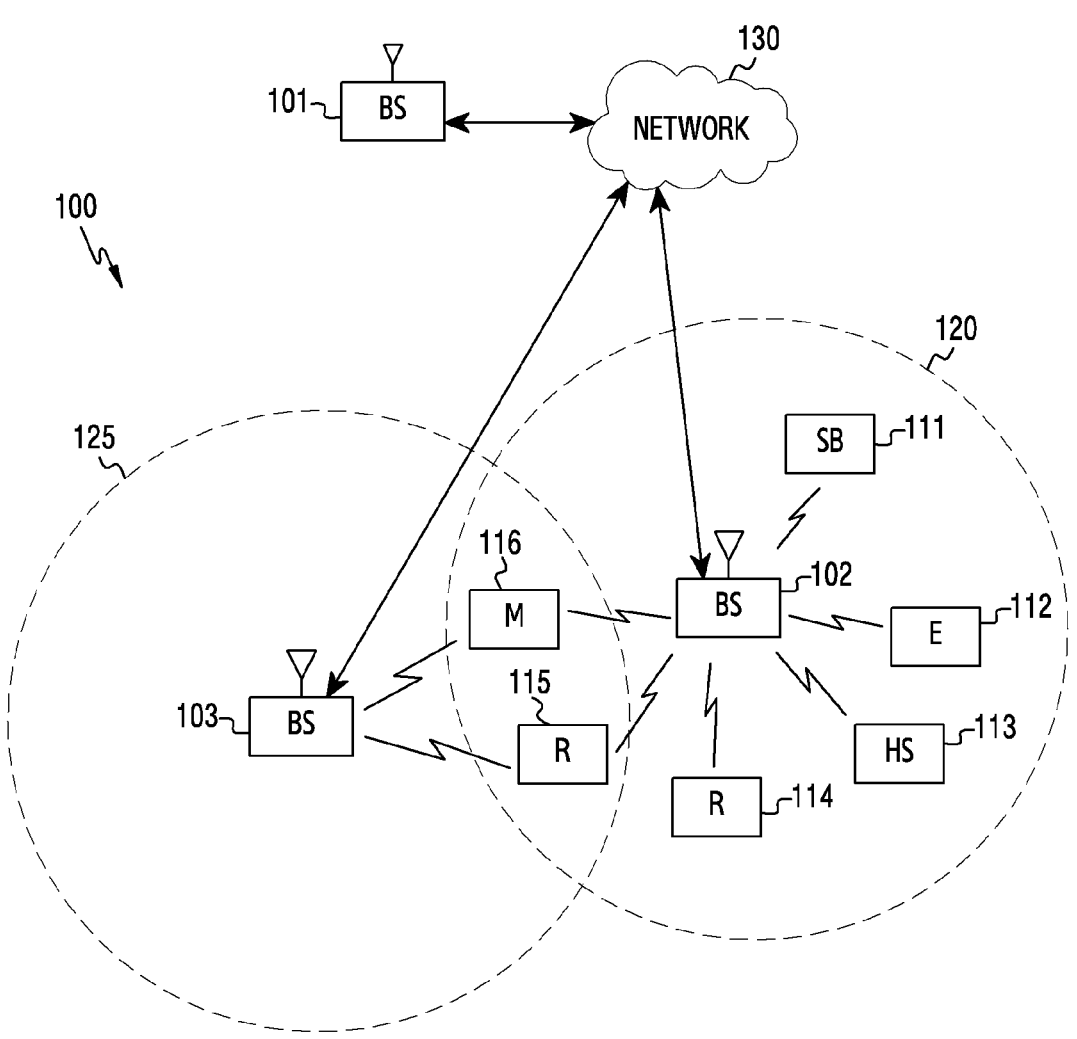
FIG. 1 illustrates an example wireless network according to an embodiment of the disclosure.

FIG. 1 illustrates an example wireless network according to an embodiment of the disclosure. The embodiment of the wireless network 100 shown in FIG. 1 is for illustration only. Other embodiments of the wireless network 100 may be used without departing from the scope of the disclosure.

Referring to FIG. 1, the wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" may be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" may be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 may communicate with each other and with UEs 111-116 using 5G, Long Term Evolution (LTE), long term evolution advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes may be made to FIG. 1. The wireless network 100 may include any number of gNBs and any number of UEs in any suitable arrangement, for example. Furthermore, gNB 101 may directly communicate with any number of UEs and provide wireless broadband access to the network 130 for those UEs. Similarly, each gNB 102-103 may directly communicate with the network 130 and provide direct wireless broadband access to the network 130 for the UEs. In addition, gNB 101, 102 and/or 103 may provide access to other or additional external networks, such as external telephone networks or other types of data networks.

Figure 2A:
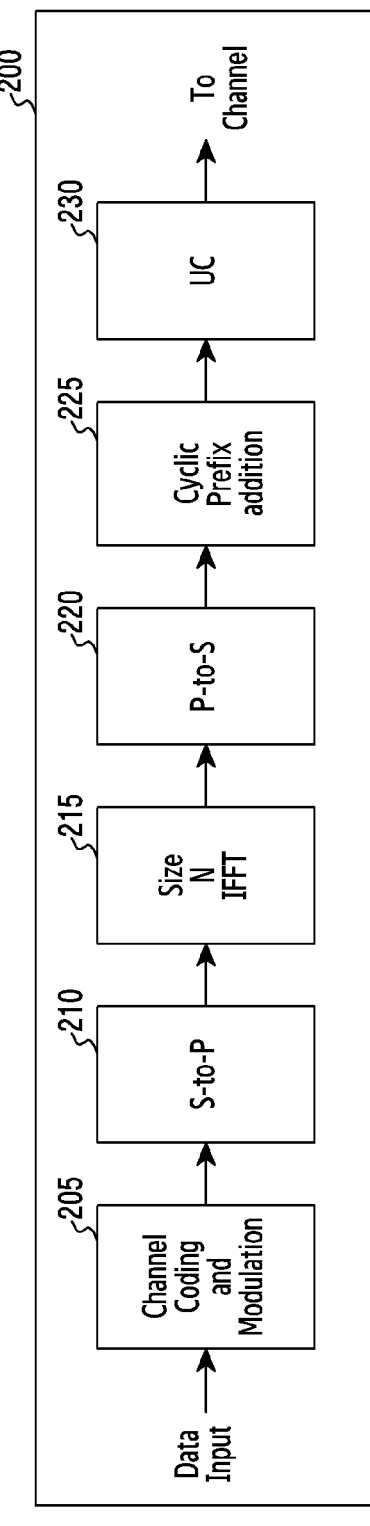
FIGS. 2A and 2B illustrate example wireless transmission and reception paths according to various embodiments of the disclosure.
Figure 2B:
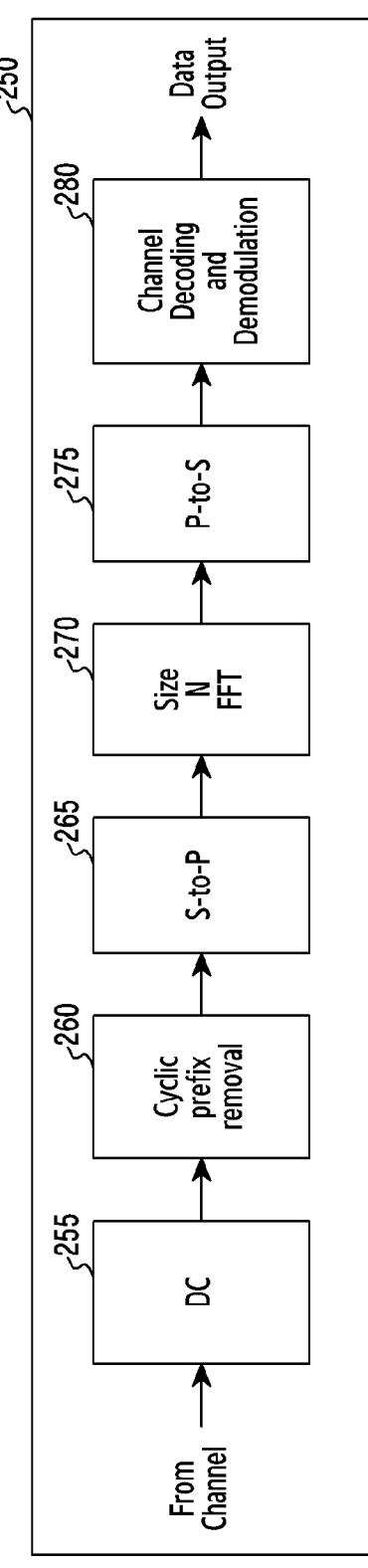

FIGS. 2A and 2B illustrate example wireless transmission and reception paths according to various embodiments of the disclosure.

Referring to FIGS. 2a and 2B, in the following description, the transmission path 200 may be described as being implemented in a gNB, such as gNB 102, and the reception path 250 may be described as being implemented in a UE, such as UE 116. However, it should be understood that the reception path 250 may be implemented in a gNB and the transmission path 200 may be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to a radio frequency (RF) for transmission via a wireless channel. The signal may also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B may be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B may be combined, further subdivided or omitted, and additional components may be added according to specific requirements. Furthermore, FIGS. 2A and 2B are intended to illustrate examples of types of transmission and reception paths that may be used in a wireless network. Any other suitable architecture may be used to support wireless communication in a wireless network.

Figure 3A:
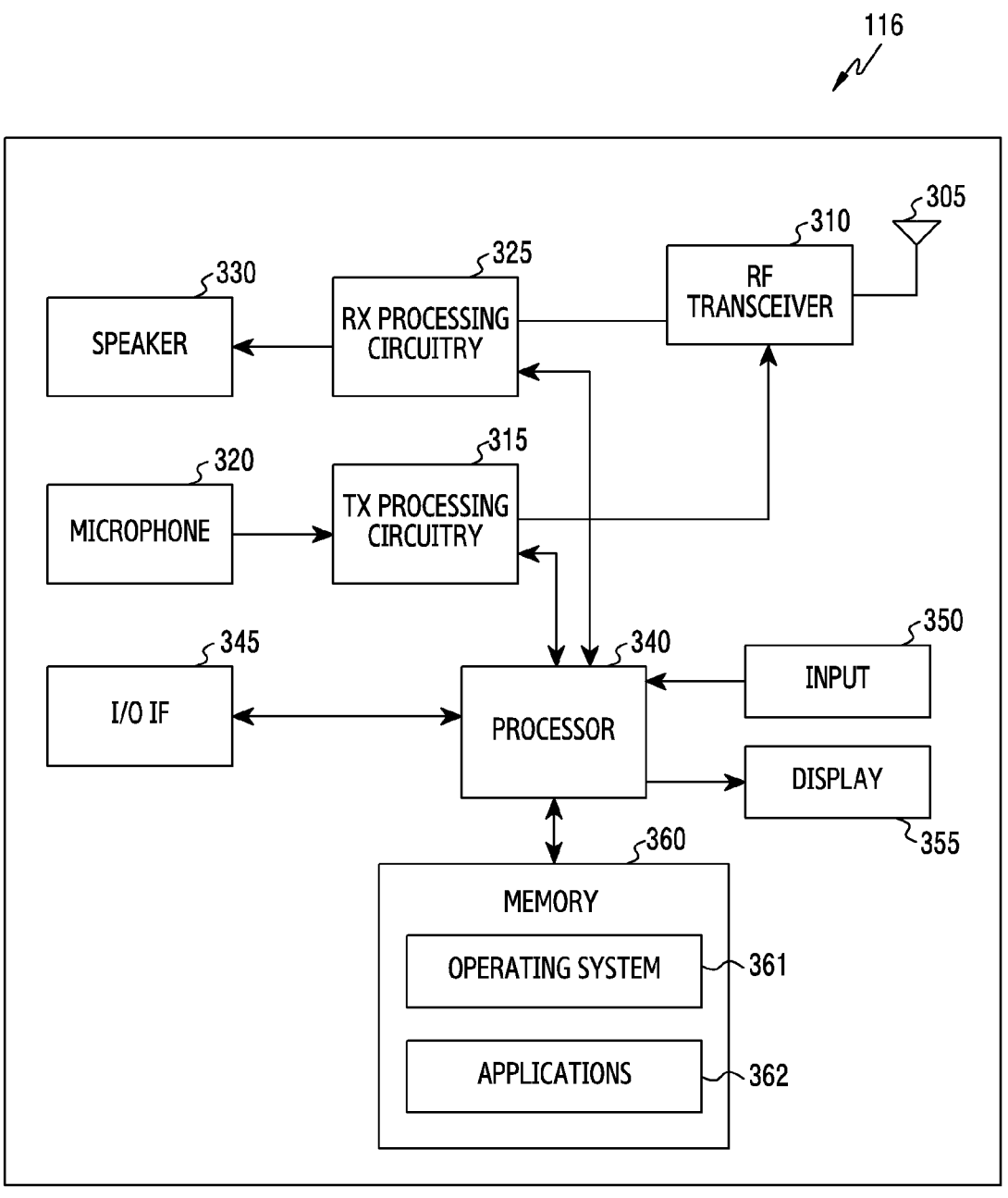
FIG. 3A shows an example UE according to an embodiment of the disclosure.

FIG. 3A illustrates an example a UE according to an embodiment of the disclosure.

Referring to FIG. 3A, the embodiment of a UE 116 is for illustration only, and UEs 111-115 of FIG. 1 may have the same or similar configuration. However, a UE has various configurations, and FIG. 3A does not limit the scope of the disclosure to any specific implementation of the UE.

The UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 in order to control the overall operation of the UE 116. For example, the processor/controller 340 may control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or micro-controller.

The processor/controller 340 is also capable of executing other processes and programs residing in the memory 360, such as operations for channel quality measurement and reporting for systems with 2D antenna arrays as described in embodiments of the disclosure. The processor/controller 340 may move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 may input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3A illustrates an example of the UE 116, various changes may be made to FIG. 3A. For example, various components in FIG. 3A may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3A illustrates that the UE 116 is configured as a mobile phone or a smart phone, UEs may be configured to operate as other types of mobile or fixed devices.

Figure 3B:
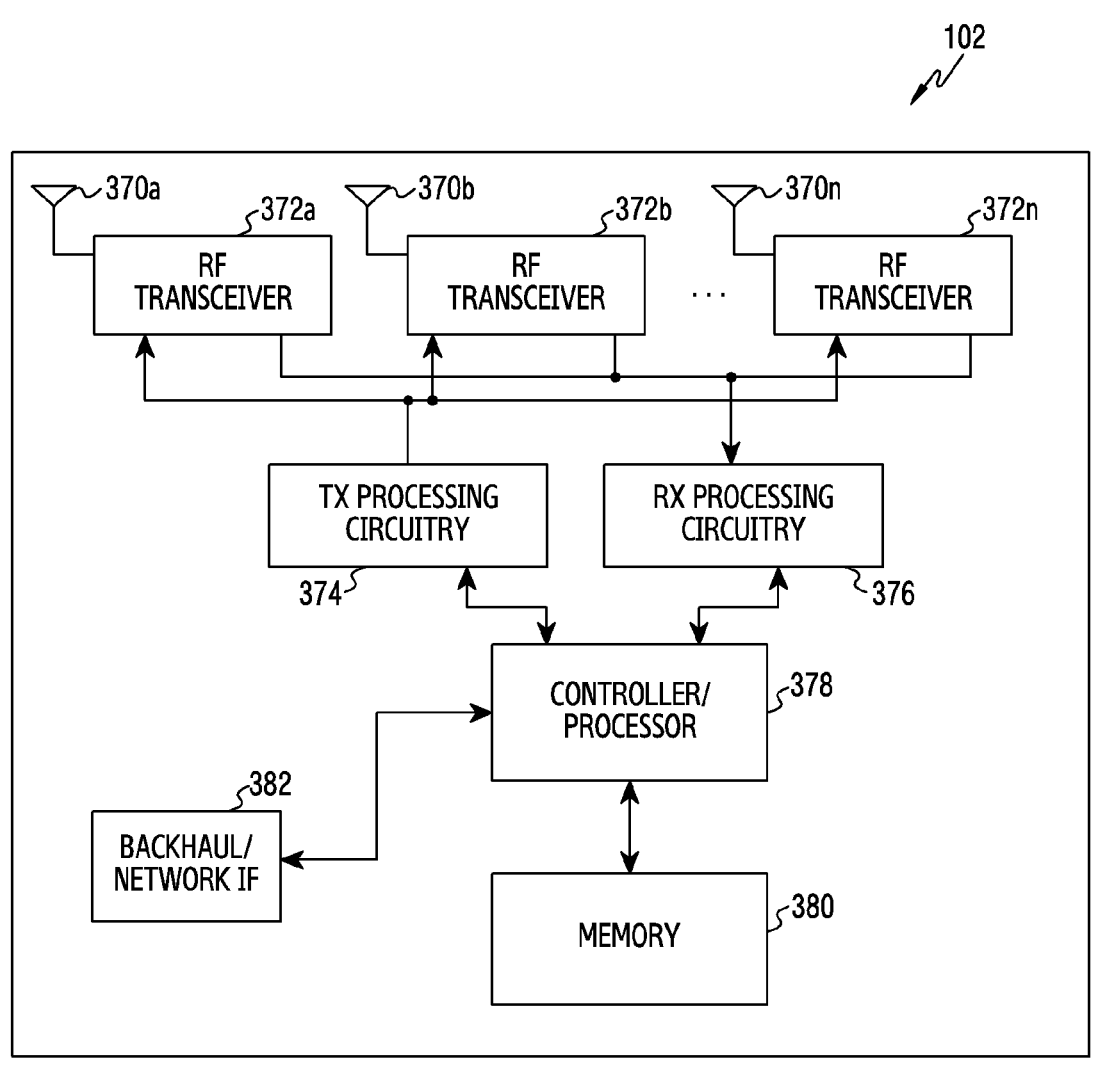
FIG. 3B shows an example gNB according to an embodiment of the disclosure.

FIG. 3B illustrates an example gNB according to an embodiment of the disclosure. The embodiment of the gNB 102 shown in FIG. 3B is for illustration only, and other gNBs of FIG. 1 may have the same or similar configuration. However, a gNB has various configurations, and FIG. 3Bb does not limit the scope of the disclosure to any specific implementation of a gNB. It should be noted that gNB 101 and gNB 103 may include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

The RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal.

RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 may include one or more processors or other processing devices that control the overall operation of gNB 102. For example, the controller/processor 378 may control the reception of forward channel signals and the transmission of backward channel signals through the RF transceivers 372a-372n, the RX processing circuit 376 and the TX processing circuit 374 according to well-known principles. The controller/processor 378 may also support additional functions, such as higher-level wireless communication functions. For example, the controller/processor 378 may perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 may also support channel quality measurement and reporting for systems with 2D antenna arrays as described in embodiments of the disclosure. In some embodiments, the controller/processor 378 supports communication between entities such as web real-time communications (RTCs). The controller/processor 378 may move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 may support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 may allow gNB 102 to communicate with other gNBs through wired or wireless backhaul connections. When gNB 102 is implemented as an access point, the backhaul or network interface 382 may allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 may include an RAM, while another part of the memory 380 may include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 may include any number of each component shown in FIG. 3A. As a specific example, the access point may include many backhaul or network interfaces 382, and the controller/processor 378 may support routing functions to route data between different network addresses. As another specific example, although shown as including a single instance of the TX processing circuit 374 and a single instance of the RX processing circuit 376, gNB 102 may include multiple instances of each (such as one for each RF transceiver).

The various embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples may be made without departing from the scope of the disclosure.

The transmission from a base station to a User Equipment (UE) is called downlink, and the transmission from a UE to a base station is called uplink. HARQ-ACK information for a Physical Downlink Shared Channel (PDSCH) may be transmitted on a Physical Uplink Shared Channel (PUSCH) or a Physical Uplink Control Channel (PUCCH). Furthermore, a PDSCH is scheduled by Downlink Control Information (DCI) transmitted in a Physical Downlink Control Channel (PDCCH).

A unicast PDSCH refers to a PDSCH received by a UE, and the scrambling of the unicast PDSCH is performed based on a UE-specific Radio Network Temporary Indicator (RNTI), such as C-RNTI. A groupcast or multicast/broadcast PDSCH refers to a PDSCH received by more than one UE (for example, one or more UEs) at the same time.

There is a need to provide a technology for transmitting HARQ-ACK information for a groupcast or multicast/broadcast PDSCH.

Hereinafter, the description will be made by taking transmission of HARQ-ACK information for a PDSCH on PUCCH as an example. However, it should be understood by those skilled in the art that HARQ-ACK information for a PDSCH may also be transmitted on a PUSCH or on a Physical Random Access Channel (PRACH). Furthermore, it should be understood that the solution of using a PUCCH as an uplink resource for transmitting HARQ-ACK information for a PDSCH described later is also applicable to the case of using a PUSCH and/or a PRACH as an uplink resource for transmitting HARQ-ACK information for a PDSCH.

In addition, it should also be understood that although the description herein mainly takes a PDSCH as an example of downlink data, the principles and techniques of this application may also be applied to other types of downlink data.

Figure 4:
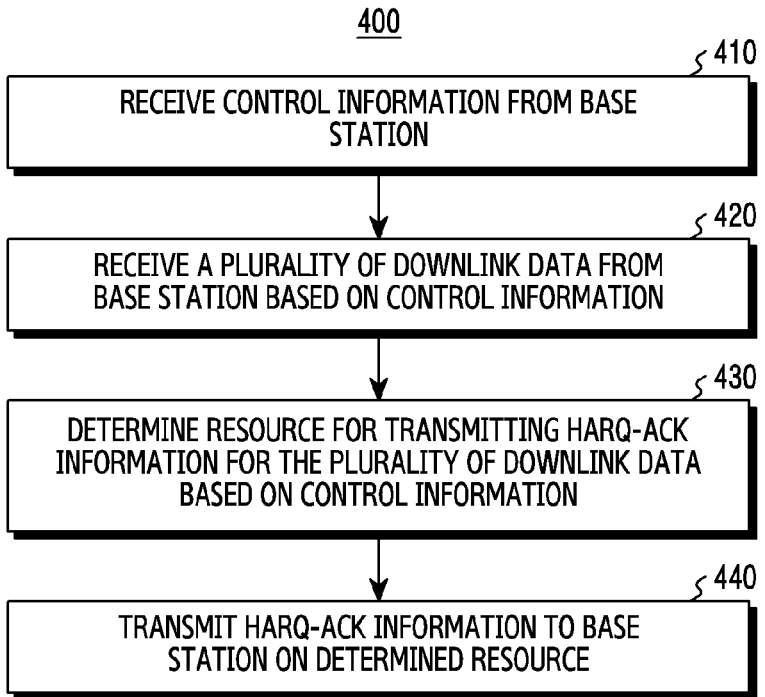
FIG. 4 shows a flowchart of an example method according to an embodiment of the disclosure.

FIG. 4 shows a flowchart of an example method according to an embodiment of the disclosure. An example method 400 of FIG. 4 may be used to transmit hybrid automatic repeat request acknowledgement (HARQ-ACK) information. The method 400 may be implemented at the UE side.

Referring to FIG. 4, in operation 410 of the method 400, the UE may receive control information from a base station. For example, the control information may be downlink control information (DCI).

In operation 420, the UE may receive one or more downlink data based on the control information. For example, the downlink data may be a PDSCH. The control information may include field(s) related to transmission of downlink data, and the UE may receive one or more downlink data based on information indicated by the relevant field(s) in the control information.

In operation 430, the UE may determine a resource for transmitting HARQ-ACK(s) for one or more received downlink data based on the control information.

According to an embodiment of the disclosure, determining the resource for transmitting HARQ-ACK information includes determining a first resource for transmitting HARQ-ACK information for one or more received downlink data.

According to the embodiment of the disclosure, the PUCCH resource for transmitting HARQ-ACK information may be indicated by a PUCCH resource indicator (PRI) field in DCI or configured through higher-layer signaling.

In operation 440, HARQ-ACK information is transmitted to the base station on the determined resource.

Figure 5:
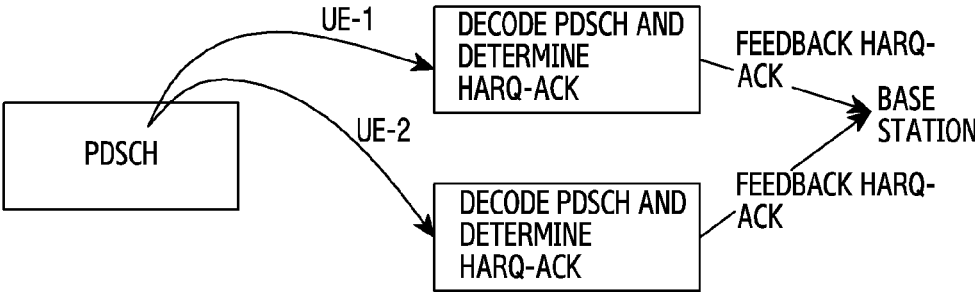
FIG. 5 shows a schematic diagram of a specific example for transmitting hybrid automatic repeat request acknowledgement (HARQ-ACK) information according to an embodiment of the disclosure.

FIG. 5 shows a schematic diagram of a specific example for transmitting hybrid automatic repeat request acknowledgement (HARQ-ACK) information according to an embodiment of the disclosure.

Referring to FIG. 5, as the downlink data, the PDSCH may be a multicast PDSCH or a broadcast PDSCH, that is, the same PDSCH may be received by more than one UE. Referring to FIG. 5, two UEs UE-1 and UE-2 receive the same PDSCH, and determine the corresponding HARQ-ACK information according to whether the respective decoding of the PDSCH is correctly, and feedback their respective HARQ-ACK information to the base station. However, the PDSCH may not be limited to a multicast PDSCH or a broadcast PDSCH.

According to an embodiment of the disclosure, if the UE correctly decodes the PDSCH, the UE may not feedback the HARQ-ACK information, but if the UE receives the PDCCH but does not correctly decode the PDSCH, the UE may feedback an NACK on the PUCCH resource, and such HARQ-ACK feedback mode is called an NACK-only feedback mode.

According to an embodiment of the disclosure, if the UE correctly decodes the PDSCH, the UE feedback an ACK on the PUCCH resource, and if the UE receives the PDCCH but does not correctly decode the PDSCH, the UE feedback an NACK on the PUCCH resource. Such HARQ-ACK feedback mode is called an ACK/NACK feedback mode.

What is described above is the processing method when the UE needs to feed back the HARQ-ACK information for one or more PDSCH in one slot.

According to the embodiments of the disclosure, in the scenario of a multicast or broadcast PDSCH, the user equipment and at least one other user equipment may use the same resource or resource pair to transmit HARQ-ACK information for the same downlink data. When the base station receives a signal on the corresponding resource, it may correspondingly judge the reception situation of one or more downlink data at one or more user equipments. It will be described in detail below.

Figure 6:
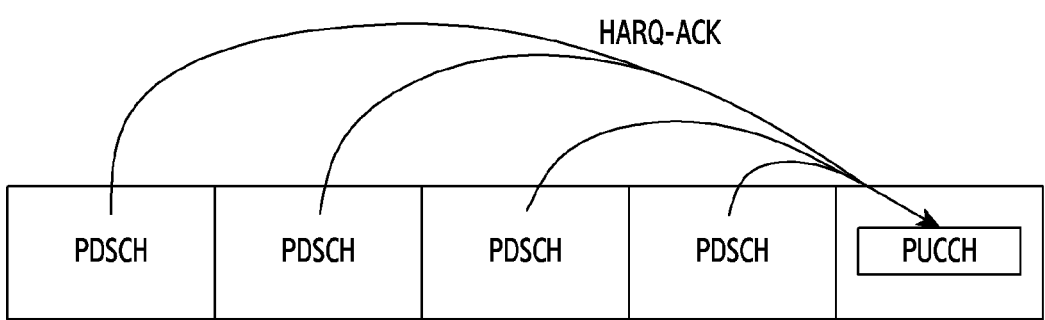
FIG. 6 shows a schematic diagram of a specific example for transmitting HARQ-ACK information according to an embodiment of the disclosure.

FIG. 6 shows a schematic diagram of a specific example for transmitting hybrid automatic repeat request acknowledgement (HARQ-ACK) information according to an embodiment of the disclosure.

Referring to FIG. 6, when the UE is to feed back HARQ-ACK information for more than one PDSCH in a slot, an embodiment of the processing method will be explained below.

Embodiment 1

When the UE receives a plurality of PDSCHs (or a PDCCH indicating SPS PDSCH release, for convenience of description, the PDSCH is described below as an example of downlink data), the UE selects a PUCCH resource from a set of PUCCH resources to transmit HARQ-ACK information for one or more PDSCHs according to the HARQ-ACK information for the one or more PDSCH. It should be noted that the methods described below take selecting a PUCCH resource from a set of PUCCH resources as an example, but these methods may also be applied to the case of selecting a signal sequence from a plurality of signal sequences in a PUCCH resource.

For different UEs receiving a multicast PDSCH, a shared PUCCH resource may be used to transmit HARQ-ACK information.

According to the embodiment of the disclosure, a first resource for transmitting HARQ-ACK information is selected from a set of resources for transmitting HARQ-ACK information.

For example, when the UE receives at least one PDSCH, the UE determines a PUCCH resource from a set of PUCCH resources according to the HARQ-ACK information for the received at least one PDSCH, and transmits the HARQ-ACK information for the at least one PDSCH on the PUCCH resource.

The specific implementation method may be:

First, determining a PUCCH resource set (or a signal sequence set).

This resource set may be determined in the following two ways. One way is to determine the PUCCH resource set semi-statically. For example, the base station configures a PUCCH resource set through higher-layer signaling, for example, PUCCH resource set S, which may include {PUCCH-1, PUCCH-2, PUCCH-3, . . . , PUCCH-15}, or S may include {PUCCH-1, PUCCH-2, PUCCH-3, . . . , PUCCH-7}, a total of 7 resources. The number of PUCCH resources included in S may be 7 or 15, and the number of PUCCH resources included in S may also be k, where k is a positive integer. Another way is to dynamically determine the PUCCH resource set, that is, the base station configures at least one resource set, and uses DCI to indicate a resource set from the configured resource sets for transmitting HARQ-ACKs.

Then, the UE determines a PUCCH resource from the determined PUCCH resource set according to the HARQ-ACK information value for the received PDSCHs, and transmits the HARQ-ACK information for the PDSCHs on the determined PUCCH resource.

Example embodiments of the disclosure will be described in detail below.

Example 1.1

The base station configures, through higher-layer signaling, a PUCCH resource set, such as PUCCH resource set S, and S may include {PUCCH-1, PUCCH-2, PUCCH-3, . . . , PUCCH-15}, a total of 15 PUCCH resources. In an implementation, the PUCCH resources in the resource set S are a set of ordered resources, for example, the order of PUCCH resources in the resource set S is PUCCH-1→PUCCH-2→PUCCH-3→ . . . , →PUCCH-15. In another implementation, each resource in the resource set S has a one-to-one mapping relationship or correspondence with a set of resource indexes. The following description of each resource in the resource set may also be replaced with the description of each resource index.

There is downlink assignment indication (DAI) in the Downlink Control Information (DCI) scheduling the PDSCH. According to the DAI in the received DCI and/or the number of SPS PDSCHs, the UE may determine the number L of downlink data (e.g., PDSCHs, which are described below as an example) for which HARQ-ACKs are to be fed back in the same uplink slot, and then, the UE may determine the PUCCH resource for the feedback of the HARQ-ACK information according to the HARQ-ACK information for the PDSCH(s).

For example, when L is equal to 1, one method is that if the HARQ-ACK information for a PDSCH is NACK, the UE feedback the HARQ-ACK information for the PDSCH on the PUCCH resource; if the HARQ-ACK information for the PDSCH is ACK, the UE does not feedback the HARQ-ACK information for the PDSCH, and the PUCCH resource for transmitting HARQ-ACK is the first PUCCH resource in the PUCCH resource set (for example, denoted as PUCCH-1 or resource index 1). For convenience of description, the first PUCCH resource in the PUCCH resource set is denoted by PUCCH-1 as below, and PUCCH-k denotes the k-th PUCCH resource in the PUCCH resource set, where k is an integer not greater than the number of resources in the resource set.

For example, when L is equal to 2, one method is to determine the transmission of HARQ-ACK information for PDSCHs according to the correspondence or mapping relationship in Table 1. When the HARQ-ACK information for all PDSCHs is ACK, the UE does not feedback the HARQ-ACK information. The PUCCH resources for transmitting HARQ-ACK are the first three PUCCH resources {PUCCH-1, PUCCH-2, PUCCH-3} in the PUCCH resource set.

TABLE 1

| HARQ-ACK information for the first PDSCH | HARQ-ACK information for the second PDSCH | PUCCH resources for feedback of HARQ-ACKs |
|---|---|---|
| NACK | ACK | PUCCH-1 |
| NACK | NACK | PUCCH-2 |
| ACK | NACK | PUCCH-3 |
| ACK | ACK | No transmission |

Table 1 describes a correspondence between HARQ-ACK information for PDSCHs and PUCCH resources for feedback of HARQ-ACKs, when L is equal to 2.

For example, when L is equal to 3, one method is to determine the transmission of HARQ-ACK information for PDSCHs according to the correspondence or mapping relationship in Table 2. When L is equal to 3 and the HARQ-ACK information for the third PDSCH is ACK, the correspondence between the HARQ-ACK information for the first PDSCH, the HARQ-ACK information for the second PDSCH and the PUCCH resources for the feedback of HARQ-ACKs is the same as when L is equal to 2, that is, the correspondence between the HARQ-ACK information for the first PDSCH, the HARQ-ACK information for the second PDSCH and the PUCCH resources for the feedback of HARQ-ACK, as in the first three rows of Table 2, is the same as that between the HARQ-ACK information for the first PDSCH, the HARQ-ACK information for the second PDSCH and the PUCCH resources for the feedback of HARQ-ACK, as in the first three rows of Table 1. The advantage of this method is that if the base station transmits the third PDSCH, but the UE does not receive the third PDSCH, it may avoid the inconsistency between the base station and the UE in understanding the transmission of HARQ-ACK information. The UE does not perform the feedback of the HARQ-ACK information when the HARQ-ACK information for all PDSCHs is ACK. When L is equal to 3, the PUCCH resources for transmitting HARQ-ACK are the first seven PUCCH resources {PUCCH-1, PUCCH-2, PUCCH-3, PUCCH-4, PUCCH-5, PUCCH-6, PUCCH-7} in the PUCCH resource set.

TABLE 2

| HARQ-ACK information for the first PDSCH | HARQ-ACK information for the second PDSCH | HARQ-ACK information for the third PDSCH | PUCCH resources for feedback of HARQ-ACKs |
|---|---|---|---|
| NACK | ACK | ACK | PUCCH-1 |
| NACK | NACK | ACK | PUCCH-2 |
| ACK | NACK | ACK | PUCCH-3 |
| NACK | ACK | NACK | PUCCH-4 |
| ACK | ACK | NACK | PUCCH-5 |
| ACK | NACK | NACK | PUCCH-6 |
| NACK | NACK | NACK | PUCCH-7 |
| ACK | ACK | ACK | No transmission |

Table 2 describes a correspondence between HARQ-ACK information for PDSCHs and PUCCH resources for feedback of HARQ-ACKs, when L is equal to 3.

For example, when L is equal to 4, one method is to determine the transmission of HARQ-ACK information for PDSCHs according to the correspondence or mapping relationship in Table 3. When L is equal to 4 and the HARQ-ACK information for the fourth PDSCH is ACK, the correspondence between the HARQ-ACK information for the first PDSCH, the HARQ-ACK information for the second PDSCH, the HARQ-ACK information for the third PDSCH and the PUCCH resources for the feedback of HARQ-ACKs is the same as when L is equal to 3, that is, the correspondence between the HARQ-ACK information for the first PDSCH, the HARQ-ACK information for the second PDSCH, and the HARQ-ACK information for the third PDSCH, and the PUCCH resources for the feedback of HARQ-ACKs as in the first seven rows of Table 3, is the same as that between the HARQ-ACK information for the first PDSCH, the HARQ-ACK information for the second PDSCH, and the HARQ-ACK information for the third PDSCH, and the PUCCH resources for the feedback of HARQ-ACKs as in the first seven rows of Table 2. The advantage of this method is that if the base station transmits the fourth PDSCH, but the UE does not receive the fourth PDSCH, it may avoid the inconsistency between the base station and the UE in understanding the transmission of HARQ-ACK information. The UE does not perform the feedback of the HARQ-ACK information when all the HARQ-ACK information for PDSCHs is ACK. When L is equal to 4, the PUCCH resources for transmitting HARQ-ACK are the first fifteen PUCCH resources{PUCCH-1, PUCCH-2, PUCCH-3, PUCCH-4, PUCCH-5, PUCCH-6, PUCCH-7, PUCCH-8, PUCCH-9, PUCCH-10, PUCCH-11, PUCCH-12, PUCCH-13, PUCCH-14, PUCCH-15} in the PUCCH resource set.

TABLE 3

| HARQ-ACK information for the first PDSCH | HARQ-ACK information for the second PDSCH | HARQ-ACK information for the third PDSCH | HARQ-ACK information for the fourth PDSCH | PUCCH resources for feedback of HARQ-ACKs |
|---|---|---|---|---|
| NACK | ACK | ACK | ACK | PUCCH-1 |
| NACK | NACK | ACK | ACK | PUCCH-2 |
| ACK | NACK | ACK | ACK | PUCCH-3 |
| NACK | ACK | NACK | ACK | PUCCH-4 |
| ACK | ACK | NACK | ACK | PUCCH-5 |
| ACK | NACK | NACK | ACK | PUCCH-6 |
| NACK | NACK | NACK | ACK | PUCCH-7 |
| NACK | ACK | ACK | NACK | PUCCH-8 |
| NACK | NACK | ACK | NACK | PUCCH-9 |
| ACK | NACK | ACK | NACK | PUCCH-10 |
| NACK | ACK | NACK | NACK | PUCCH-11 |
| ACK | ACK | NACK | NACK | PUCCH-12 |
| ACK | NACK | NACK | NACK | PUCCH-13 |
| NACK | NACK | NACK | NACK | PUCCH-14 |
| ACK | ACK | ACK | NACK | PUCCH-15 |
| ACK | ACK | ACK | ACK | No transmission |

Table 3 describes a correspondence between HARQ-ACK information for PDSCHs and PUCCH resources for the feedback of HARQ-ACKs, when L is equal to 4.

With the above method, for one or more UEs receiving a multicast PDSCH, the one or more UEs share the same PUCCH resources to transmit HARQ-ACK information, and the base station may know the general reception situation of the multicast or broadcast PDSCH at the one or more UEs by receiving signals on the corresponding PUCCH resources. For example, if the base station receives a feedback signal on PUCCH-1, and the base station transmits three PDSCHs to the UEs in the previous scheduling, the base station may determine that the feedback information for the first PDSCH is NACK, the feedback information for the second PDSCH is ACK, and the feedback information for the third PDSCH is ACK according to Table 2. Therefore, according to the feedback information, the base station may retransmit the first PDSCH to the one or more UEs.

On the other hand, when scheduling multicast or multicast downlink transmission to UEs, the base station may flexibly use the remaining uplink resources according to the number of scheduled downlink transmission. For example, if the base station schedules the transmission of two PDSCHs to the UEs, only three uplink resources are needed for the feedback of the HARQ-ACK information for the transmission of the two PDSCHs (for example, according to Table 1, when L=2, the uplink resources for the UE to feed back the HARQ-ACK information are PUCCH-1, PUCCH-2, and PUCCH-3). Therefore, in the case where the resource set S configured in the higher-layer signaling for the feedback of HARQ-ACK information is {PUCCH-1, PUCCH-2, PUCCH-3, PUCCH-4, PUCCH-5, PUCCH-6, PUCCH-7, PUCCH-8, PUCCH-9, PUCCH-10, PUCCH-11, PUCCH-7. PUCCH-14, PUCCH-15}, the base station may use the remaining 12 uplink resources {PUCCH-4, PUCCH-5, PUCCH-6, PUCCH-7, PUCCH-8, PUCCH-9, PUCCH-10, PUCCH-11, PUCCH-12, PUCCH The PUCCH-15} for other purposes, so that the PUCCH resources for transmitting HARQ-ACK may be saved, and the saved PUCCH resources (for example, the PUCCH resources configured through higher-layer signaling for transmitting HARQ-ACK except the resources actually used by UE for the feedback of HARQ-ACK information) may be scheduled or configured for other purposes.

Example 1.2

The UE determines the PUCCH resource set for the feedback of HARQ-ACK information according to the number M of PDSCHs for which the feedback of HARQ-ACK information is required, where the number M is indicated by signaling from the base station or determined according to the number of PUCCH resources in the PUCCH resource set indicated through signaling from the base station. For example, the relationship between the number M of PDSCHs for which the feedback of HARQ-ACK information is required and the number N of PUCCH resources in the PUCCH resource set is: M is equal to log 2(N+1).

According to various embodiments of the disclosure, the number P of PDSCHs received by the UE is not necessarily consistent with the number M of PDSCHs for which the feedback of HARQ-ACK information is required determined based on the signaling indication of the base station. For example, the number P of PDSCHs actually received by the UE may be less than or equal to M. In case of feedback of the HARQ-ACK information, the UE ranks the HARQ-ACK information for the received PDSCHs and/or SPS PDSCHs first, and if the number P of PDSCHs received by the UE is less than M, the UE appends M-P NACKs in or after the HARQ-ACK information for the received PDSCHs and/or SPS PDSCHs. For example, if M is equal to 4 and P is equal to 2, that is, the UE receives two PDSCHs, namely PDSCH-1 and PDSCH-2, then the HARQ-ACK to be fed back is {HARQ-ACK for PDSCH-1, HARQ-ACK for PDSCH-2, NACK, NACK}.

For example, when M is equal to 1, one method is that if the HARQ-ACK information for a PDSCH is NACK, the UE feedback the HARQ-ACK information for the PDSCH on a PUCCH resource, and if the HARQ-ACK information for the PDSCH is ACK, the UE does not feedback the HARQ-ACK information for the PDSCH.

For example, when M is equal to 2, one method is to determine the transmission of HARQ-ACK information for PDSCHs according to the correspondence or mapping relationship in Table 1. When the HARQ-ACK information for all PDSCHs is ACK, the UE does not feedback the HARQ-ACK information.

For example, when M is equal to 3, one method is to determine the transmission of HARQ-ACK information for PDSCHs according to the correspondence or mapping relationship in Table 2. When M is equal to 3 and the HARQ-ACK information for the third PDSCH is ACK, the correspondence between the HARQ-ACK information for the first PDSCH, the HARQ-ACK information for the second PDSCH and the PUCCH resources for the feedback of HARQ-ACKs is the same as when M is equal to 2, that is, the correspondence between the HARQ-ACK information for the first PDSCH, the HARQ-ACK information for the second PDSCH and the PUCCH resources for the feedback of HARQ-ACKs as in the first three rows of Table 2, is the same as that between the HARQ-ACK information for the first PDSCH, the HARQ-ACK information for the second PDSCH and the PUCCH resources for the feedback of HARQ-ACKs as in the first three rows of Table 1. The UE does not perform the feedback of HARQ-ACK information when the HARQ-ACK information for all PDSCHs is ACK.

For example, when M is equal to 4, one method is to determine the transmission of HARQ-ACK information for PDSCHs according to the correspondence or mapping relationship in Table 3. When M is equal to 4 and the HARQ-ACK information for the fourth PDSCH is ACK, the correspondence between the HARQ-ACK information for the first PDSCH, the HARQ-ACK information for the second PDSCH, the HARQ-ACK information for the third PDSCH and the PUCCH resources for the feedback of the HARQ-ACKs is the same as when M is equal to 3, that is, the correspondence between the HARQ-ACK information for the first PDSCH, the HARQ-ACK information for the second PDSCH, the HARQ-ACK information for the third PDSCH and the PUCCH resources for the feedback of the HARQ-ACKs as in the first seven rows of Table 3, is the same as that between the HARQ-ACK information for the first PDSCH, the HARQ-ACK information for the second PDSCH, the HARQ-ACK information for the third PDSCH and the PUCCH resources for the feedback of the HARQ-ACKs as in the first seven rows of Table 2. The UE does not perform feedback of the HARQ-ACK information when the HARQ-ACK information for all PDSCHs is ACK.

With the method described in Example 1.2 above, when the UE misses the detection of the last PDSCH, the inconsistency between the base station and the UE with regard to the understanding in the number of scheduled PDSCHs may be prevented, thus preventing the base station from receiving HARQ-ACK information incorrectly.

Example 1.3

The base station may configure according to signaling that the UE may adopt the method of Example 1.1 or Example 1.2 to determine the resources for the feedback of the HARQ-ACK information. For example, the UE may perform according to the received higher-layer signaling configuring that the UE can adopt the method of Example 1.1 or Example 1.2. The advantage of this method is that the base station may flexibly configure to achieve the purpose of saving PUCCH resources, or avoid the inconsistency between the base station and UE in understanding the number of HARQ-ACK bits caused by missing detection of a PDCCH.

The above example is described by taking the mapping relationship between the HARQ-ACK information value and the PUCCH resource as an example, but other mapping relationships between the HARQ-ACK information value and the PUCCH resource are not excluded.

In the above description, if for at least one PDSCH scheduled by DCI and at least one SPS PDSCH, the UE is to select a PUCCH resource for transmission of HARQ-ACK information according to the HARQ-ACK value for the received at least one PDSCH scheduled by DCI and the at least one SPS PDSCH, the HARQ-ACK for the SPS PDSCH(s) may be placed before the HARQ-ACK for the PDSCH(s) scheduled by DCI, and then a PUCCH resource may be selected according to the thus arranged HARQ-ACK values for the PDSCH(s) scheduled by DCI and the SPS PDSCH(s), in an implementation. For example, if the UE receives two PDSCHs scheduled by DCI, which are the first PDSCH scheduled by the DCI, PDSCH-1 (its DAI is equal to 1), and the second PDSCH scheduled by the DCI, PDSCH-2 (its DAI is equal to 2), and the UE receives an SPS PDSCH, the HARQ-ACKs to be fed back are: {HARQ-ACK for the SPS PDSCH, HARQ-ACK for the first PDSCH scheduled by the DCI (PDSCH-1), HARQ-ACK for the second PDSCH scheduled by the DCI (PDSCH-2)}. According to {HARQ-ACK for the SPS PDSCH, HARQ-ACK for the first PDSCH scheduled by the DCI (PDSCH-1), HARQ-ACK for the second PDSCH scheduled by the DCI (PDSCH-2)}, the PUCCH resource is then selected through the mapping relationship between the HARQ-ACK information values and the PUCCH resources. The advantage of this method is that it may reduce a difference in the understanding of HARQ-ACK information between the UE and the base station when the UE misses detection of a dynamic scheduling PDSCH.

Figure 7:
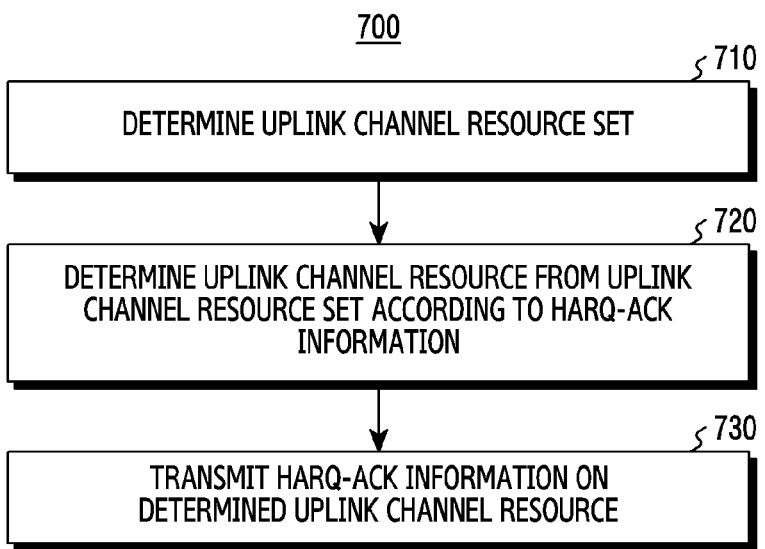
FIG. 7 shows a schematic flowchart of a method according to an embodiment of the disclosure.

FIG. 7 shows a schematic flowchart of a method according to an embodiment of the disclosure.

Referring to FIG. 7, a method 700 includes the following steps.

Operation 710: determine an uplink channel resource set; Operation 720: determine an uplink channel resource from the uplink channel resource set, according to hybrid automatic repeat request acknowledgement (HARQ-ACK) information; and Operation 730: transmit the HARQ-ACK information on the determined uplink channel resource.

Figure 8:
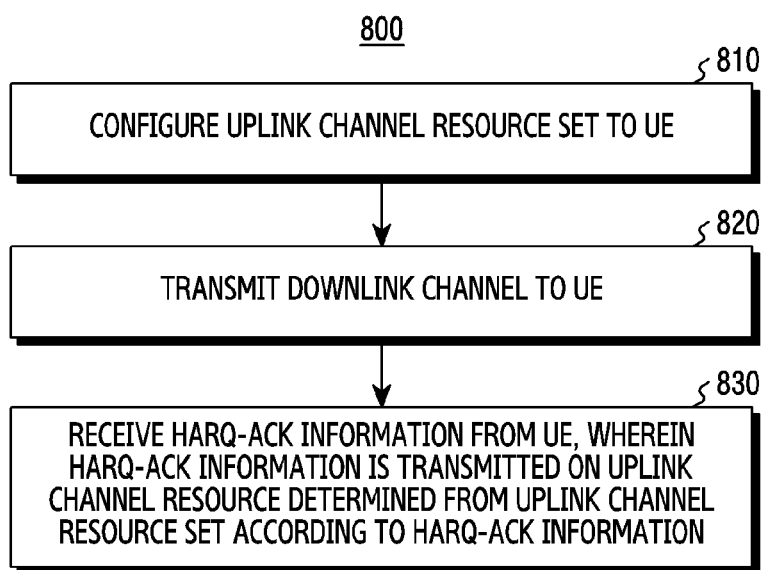
FIG. 8 shows a schematic flowchart of a method according to an embodiment of the disclosure.

FIG. 8 shows a schematic flowchart of a method according to an embodiment of the disclosure. Referring to FIG. 8, the method 800 includes the following steps.

Operation 810: configure an uplink channel resource set to a user equipment (UE); Operation 820: transmit a downlink channel to the UE; and Operation 830: receive hybrid automatic repeat request acknowledgement (HARQ-ACK) information from the UE, wherein the HARQ-ACK information is transmitted on an uplink channel resource determined from the uplink channel resource set according to the HARQ-ACK information.

Figure 9:
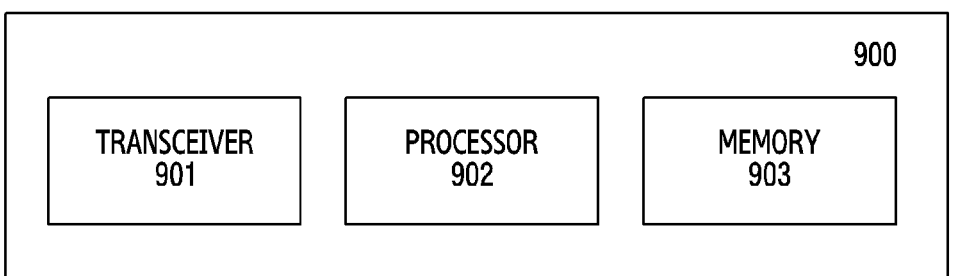
FIG. 9 shows a schematic hardware block diagram of a user equipment (UE) according to an embodiment of the disclosure.

FIG. 9 shows a block diagram of an example UE according to an embodiment of the disclosure.

Referring to FIG. 9, a UE 900 includes a transceiver 901, a processor 902 and a memory 903. Under the control of the processor 902 (which may be implemented as one or more processors), the UE 900 may be configured to perform related operations performed by the UE in the above-described methods. Although the transceiver 901, the processor 902 and the memory 903 are shown as separate entities, they may be implemented as a single entity, such as a single chip. Transceiver 901, processor 902 and memory 903 may be electrically connected or coupled to each other. Transceiver 901 may transmit and receive signals to and from other network entities, such as nodes (which may be, for example, base stations, relay nodes, etc.) and/or another UE. In some embodiments, the transceiver 901 may be omitted. In this case, the processor 902 may be configured to execute the instructions (including computer programs) stored in the memory 903 to control the overall operation of the UE 900, thereby realizing the operations in the flow of the above method.

Figure 10:
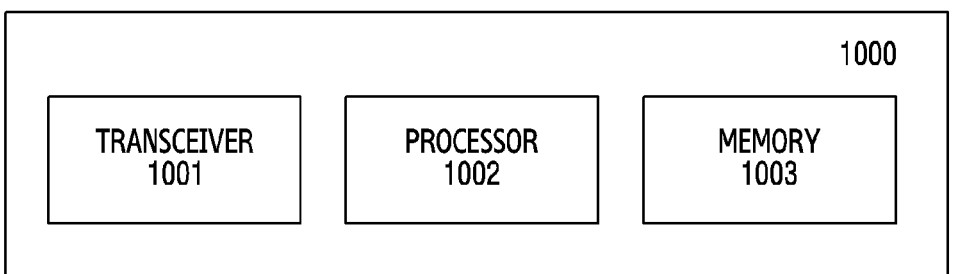
FIG. 10 shows a schematic hardware block diagram of a base station according to an embodiment of the disclosure.

FIG. 10 shows a block diagram of an example base station according to an embodiment of the disclosure.

Referring to FIG. 10, a base station 1000 includes a transceiver 1001, a processor 1002 and a memory 1003. Under the control of the processor 1002 (which may be implemented as one or more processors), the base station 1000 may be configured to perform the related operations performed by the base station in the above-described methods. Although the transceiver 1001, the processor 1002 and the memory 1003 are shown as separate entities, they may be implemented as a single entity, such as a single chip. Transceiver 1001, processor 1002 and memory 1003 may be electrically connected or coupled to each other. Transceiver 1001 may transmit and receive signals to and from other network entities, such as another node (which may be, for example, a base station, a relay node, etc.) and/or a UE. In some embodiments, the transceiver 1001 may be omitted. In this case, the processor 1002 may be configured to execute the instructions (including computer programs) stored in the memory 1003 to control the overall operation of the base station 1000, thereby realizing the operations in the flow of the above method.

What is described above is only preferred embodiments of the disclosure, and it is not intended to limit the disclosure. Any modifications, equivalents, improvements, etc. made within the spirit and principle of the disclosure should be included in the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) in a wireless communication system, the UE comprising:

at least one transceiver; and at least one processor communicatively coupled to the at least one transceiver; and at least one memory, communicatively coupled to the at least one processor, storing instructions executable by the at least one processor individually or in any combination to cause the UE to:

receive, from a base station (BS), information configuring a physical uplink control channel (PUCCH) resource set including PUCCH resources, receive, from the BS, downlink control information (DCI) including a downlink assignment indication (DAI), for one or more multicast physical downlink shared channels (PDSCHs), receive, from the BS, the one or more multicast PDSCHs, identify a number of hybrid automatic repeat request-acknowledgement (HARQ-ACK) bits for the one or more multicast PDSCHs based on the DAI in the DCI, in case that the number of HARQ-ACK bits for the one or more multicast PDSCHs is one, transmit, to the BS, a first PUCCH on a first PUCCH resource among the PUCCH resource set, the first PUCCH being associated with a negative acknowledgement (NACK) value, in case that the number of HARQ-ACK bits for the one or more multicast PDSCHs is two, transmit, to the BS, a second PUCCH on a second PUCCH resource which is one of first three PUCCH resources among the PUCCH resource set, in case that the number of HARQ-ACK bits for the one or more multicast PDSCHs is three, transmit, to the BS, a third PUCCH on a third PUCCH resource which is one of first seven PUCCH resources among the PUCCH resource set, and in case that the number of HARQ-ACK bits for the one or more multicast PDSCHs is four, transmit, to the BS, a fourth PUCCH on a fourth PUCCH resource which is one of first fifteen PUCCH resources among the PUCCH resource set, wherein a PUCCH for the HARQ-ACK bits is not transmitted when all of the HARQ-ACK bits correspond to ACK values.

2. The UE of claim 1, wherein the first PUCCH resource or the second PUCCH resource is identified among the PUCCH resource set based on a value of the HARQ-ACK bits.

3. The UE of claim 1, wherein the HARQ-ACK bits are transmitted based on a NACK-only feedback mode, wherein the second PUCCH is determined according to a combination of two HARQ-ACK bits for the one or more multicast PDSCHs, wherein the third PUCCH is determined according to a combination of three HARQ-ACK bits for the one or more multicast PDSCHs, and wherein the fourth PUCCH is determined according to a combination of four HARQ-ACK bits for the one or more multicast PDSCHs.

4. A base station (BS) in a wireless communication system, the BS comprising:

at least one transceiver; and at least one processor communicatively coupled to the at least one transceiver; and at least one memory, communicatively coupled to the at least one processor, storing instructions executable by the at least one processor individually or in any combination to cause the BS to:

transmit, to a user equipment (UE), information configuring a physical uplink control channel (PUCCH) resource set including PUCCH resources, transmit, to the UE, downlink control information (DCI) including a downlink assignment indication (DAI), for one or more multicast physical downlink shared channels (PDSCHs), transmit, to the UE, the one or more multicast PDSCHs, wherein a number of hybrid automatic repeat request-acknowledgement (HARQ-ACK) bits for the one or more multicast PDSCHs is determined based on the DAI in the DCI, in case that the number of HARQ-ACK bits for the one or more multicast PDSCHs is one, receive, from the UE, a first PUCCH on a first PUCCH resource among the PUCCH resource set, the first PUCCH being associated with a negative acknowledgement (NACK) value, and in case that the number of HARQ-ACK bits for the one or more multicast PDSCHs is two, receive, from the UE, a second PUCCH on a second PUCCH resource which is one of first three PUCCH resources among the PUCCH resource set, in case that the number of HARQ-ACK bits for the one or more multicast PDSCHs is three, receive, from the UE, a third PUCCH on a third PUCCH resource which is one of first seven PUCCH resources among the PUCCH resource set, and in case that the number of HARQ-ACK bits for the one or more multicast PDSCHs is four, receive, from the UE, a fourth PUCCH on a fourth PUCCH resource which is one of first fifteen PUCCH resources among the PUCCH resource set, wherein a PUCCH for the HARQ-ACK bits is not transmitted when all of the HARQ-ACK bits correspond to ACK values.

5. The BS of claim 4, wherein the first PUCCH resource or the second PUCCH resource is identified among the PUCCH resource set based on a value of the HARQ-ACK bits.

6. The BS of claim 4, wherein the HARQ-ACK bits are received based on a NACK-only feedback mode, wherein the second PUCCH is determined according to a combination of two HARQ-ACK bits for the one or more multicast PDSCHs, wherein the third PUCCH is determined according to a combination of three HARQ-ACK bits for the one or more multicast PDSCHs, and wherein the fourth PUCCH is determined according to a combination of four HARQ-ACK bits for the one or more multicast PDSCHs.

7. A method performed by a user equipment (UE) in a wireless communication system, the method comprising:

receiving, from a base station (BS), information configuring a physical uplink control channel (PUCCH) resource set including PUCCH resources;

receiving, from the BS, downlink control information (DCI) including a downlink assignment indication (DAI), for one or more multicast physical downlink shared channel (PDSCHs);

receiving, from the BS, the one or more multicast PDSCHs;

identifying a number of hybrid automatic repeat request-acknowledgement (HARQ-ACK) bits for the one or more multicast PDSCHs based on the DAI in the DCI;

in case that the number of HARQ-ACK bits for the one or more multicast PDSCHs is one, transmitting, to the BS, a first PUCCH on a first PUCCH resource among the PUCCH resource set, the first PUCCH being associated with a negative acknowledgement (NACK) value; and in case that the number of HARQ-ACK bits for the one or more multicast PDSCHs is two, transmitting, to the BS, a second PUCCH on a second PUCCH resource which is one of first three PUCCH resources among the PUCCH resource set;

in case that the number of HARQ-ACK bits for the one or more multicast PDSCHs is three, transmitting, to the BS, a third PUCCH on a third PUCCH resource which is one of first seven PUCCH resources among the PUCCH resource set; and in case that the number of HARQ-ACK bits for the one or more multicast PDSCHs is four, transmitting, to the BS, a fourth PUCCH on a fourth PUCCH resource which is one of first fifteen PUCCH resources among the PUCCH resource set, wherein a PUCCH for the HARQ-ACK bits is not transmitted when all of the HARQ-ACK bits correspond to ACK values.

8. The method of claim 7, wherein the first PUCCH resource or the second PUCCH resource is identified among the PUCCH resource set based on a value of the HARQ-ACK bits.

9. The method of claim 7, wherein the HARQ-ACK bits are transmitted based on a NACK-only feedback mode, wherein the second PUCCH is determined according to a combination of two HARQ-ACK bits for the one or more multicast PDSCHs, wherein the third PUCCH is determined according to a combination of three HARQ-ACK bits for the one or more multicast PDSCHs, and wherein the fourth PUCCH is determined according to a combination of four HARQ-ACK bits for the one or more multicast PDSCHs.

10. A method performed by a base station (BS) in a wireless communication system, the method comprising:

transmitting, to a user equipment (UE), information configuring a physical uplink control channel (PUCCH) resource set including PUCCH resources;

transmitting, to the UE, downlink control information (DCI) including a downlink assignment indication (DAI), for one or more multicast physical downlink shared channels (PDSCHs);

transmitting, to the JE, the one or more multicast PDSCHs, wherein a number of hybrid automatic repeat request-acknowledgement (HARQ-ACK) bits for the one or more multicast PDSCHs is determined based on the DAI in the DCI;

in case that the number of HARQ-ACK bits for the one or more multicast PDSCHs is one, receiving, from the UE, a first PUCCH on a first PUCCH resource among the PUCCH resource set, the first PUCCH being associated with a negative acknowledgement (NACK) value; and in case that the number of HARQ-ACK bits for the one or more multicast PDSCHs is two, receiving, from the UE, a second PUCCH on a second PUCCH resource which is one of first three PUCCH resources among the PUCCH resource set;

in case that the number of HARQ-ACK bits for the one or more multicast PDSCHs is three, receiving, from the UE, a third PUCCH on a third PUCCH resource which is one of first seven PUCCH resources among the PUCCH resource set; and in case that the number of HARQ-ACK bits for the one or more multicast PDSCHs is four, receiving, from the UE, a fourth PUCCH on a fourth PUCCH resource which is one of first fifteen PUCCH resources among the PUCCH resource set, wherein a PUCCH for the HARQ-ACK bits is not transmitted when all of the HARQ-ACK bits correspond to ACK values.

11. The method of claim 10, wherein the first PUCCH resource or the second PUCCH resource is identified among the PUCCH resource set based on a value of the HARQ-ACK bits.

12. The method of claim 10, wherein the HARQ-ACK bits are received based on a NACK-only feedback mode, wherein the second PUCCH is determined according to a combination of two HARQ-ACK bits for the one or more multicast PDSCHs, wherein the third PUCCH is determined according to a combination of three HARQ-ACK bits for the one or more multicast PDSCHs, and wherein the fourth PUCCH is determined according to a combination of four HARQ-ACK bits for the one or more multicast PDSCHs.

* * * * *